(12) United States Patent
Goto et al.

(10) Patent No.: US 8,201,212 B2
(45) Date of Patent: Jun. 12, 2012

(54) RECEIVING APPARATUS, RECEIVING METHOD, AND TRANSMITTING/RECEIVING APPARATUS

(75) Inventors: Koichi Goto, Kanagawa (JP); Shinji Takada, Kanagawa (JP)

(73) Assignee: Sony Corporation (JP)

( * ) Notice: Subject to any disclaimer, the term of this patent is extended or adjusted under 35 U.S.C. 154(b) by 986 days.

(21) Appl. No.: 10/524,175

(22) PCT Filed: Jul. 6, 2004

(86) PCT No.: PCT/JP2004/009908
§ 371 (c)(1),
(2), (4) Date: Feb. 10, 2005

(87) PCT Pub. No.: WO2005/004468
PCT Pub. Date: Jan. 13, 2005

(65) Prior Publication Data
US 2006/0053472 A1    Mar. 9, 2006

(30) Foreign Application Priority Data

Jul. 7, 2003    (JP) ................................ P2003-271287

(51) Int. Cl.
*H04N 7/16* (2006.01)
(52) U.S. Cl. .............................. 725/141; 725/78; 725/80
(58) Field of Classification Search .................... 725/78, 725/80, 133, 141
See application file for complete search history.

(56) References Cited

U.S. PATENT DOCUMENTS

| | | | |
|---|---|---|---|
| 5,557,338 A * | 9/1996 | Maze et al. ...................... 725/38 |
| 5,929,849 A * | 7/1999 | Kikinis .......................... 725/113 |
| 6,020,930 A | 2/2000 | Legrand | |
| 6,104,334 A * | 8/2000 | Allport ......................... 341/175 |
| 6,115,080 A | 9/2000 | Reitmeier | |
| 6,263,503 B1 * | 7/2001 | Margulis .......................... 725/81 |
| 6,437,836 B1 * | 8/2002 | Huang et al. .................. 348/734 |
| 6,460,181 B1 * | 10/2002 | Donnelly ........................ 725/50 |
| 6,707,503 B1 * | 3/2004 | Naka et al. .................... 348/537 |
| 6,717,622 B2 * | 4/2004 | Lan .............................. 348/625 |
| 6,816,201 B1 * | 11/2004 | Fang et al. .................... 348/468 |
| 7,437,751 B2 * | 10/2008 | Daniels ........................ 725/112 |
| 2002/0031120 A1 | 3/2002 | Rakib | |
| 2002/0057209 A1 | 5/2002 | Sampsell | |
| 2002/0122137 A1 | 9/2002 | Chen et al. | |
| 2002/0149541 A1 * | 10/2002 | Shin .............................. 345/3.1 |
| 2003/0041334 A1 | 2/2003 | Lu | |
| 2003/0074672 A1 * | 4/2003 | Daniels ........................ 725/110 |
| 2003/0187885 A1 * | 10/2003 | Miyazaki et al. ............. 707/203 |

(Continued)

FOREIGN PATENT DOCUMENTS

EP    1 117 214 A2    7/2001

(Continued)

*Primary Examiner* — Brian Pendleton
*Assistant Examiner* — Nnenna Ekpo
(74) *Attorney, Agent, or Firm* — Lerner, David, Littenberg, Krumholz & Mentlik, LLP

(57) ABSTRACT

A signal from a tuner is outputted to a primary display. An analog signal from another tuner is digitally compressed, subjected to an encrypting process, transmitted to a secondary display by a wireless LAN, and displayed by an LCD of the secondary display. An output of a digital tuner is displayed by the primary display. A video signal of 480I is transmitted to the secondary display. A signal inputted through the Internet is decoded and sent to the primary display. The signal is sent to the secondary display in the compressed state without being decoded and the decoding process is executed in the secondary display.

19 Claims, 9 Drawing Sheets

U.S. PATENT DOCUMENTS

2003/0202006 A1 * 10/2003 Callway .................. 345/719

FOREIGN PATENT DOCUMENTS

| | | |
|---|---|---|
| JP | 6141198 | 5/1994 |
| JP | 08-307728 | 11/1996 |
| JP | 10-257400 | 9/1998 |
| JP | 11-196345 | 7/1999 |
| JP | 11191869 | 7/1999 |
| JP | 2000-041198 | 2/2000 |
| JP | 2000059704 | 2/2000 |
| JP | 2001-203908 | 7/2001 |
| JP | 2002-111615 | 4/2002 |
| JP | 2003-046497 | 2/2003 |
| JP | 2003-134511 | 5/2003 |
| JP | 2003-244570 | 8/2003 |
| WO | WO-01/63430 A1 | 8/2001 |

* cited by examiner

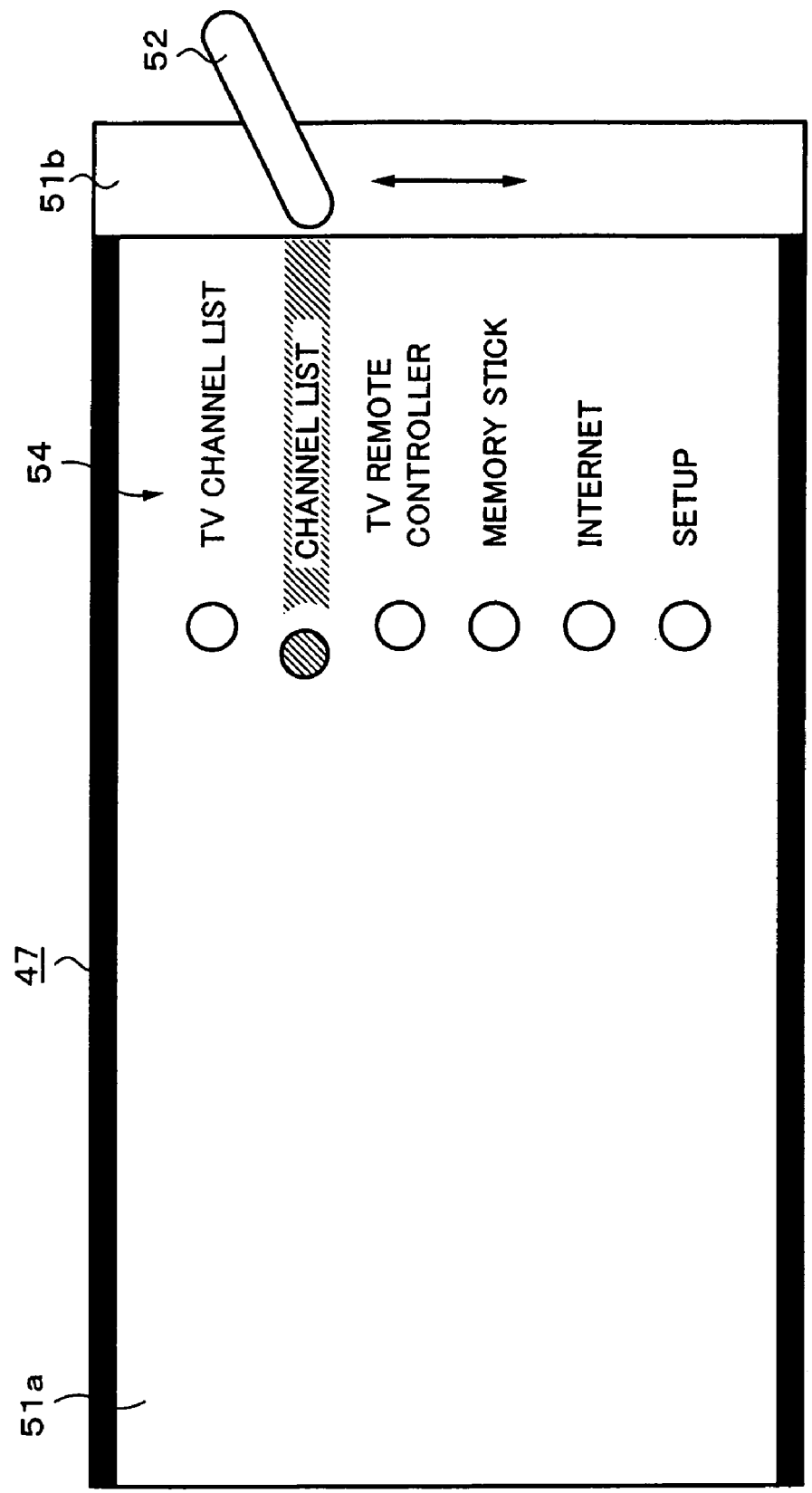

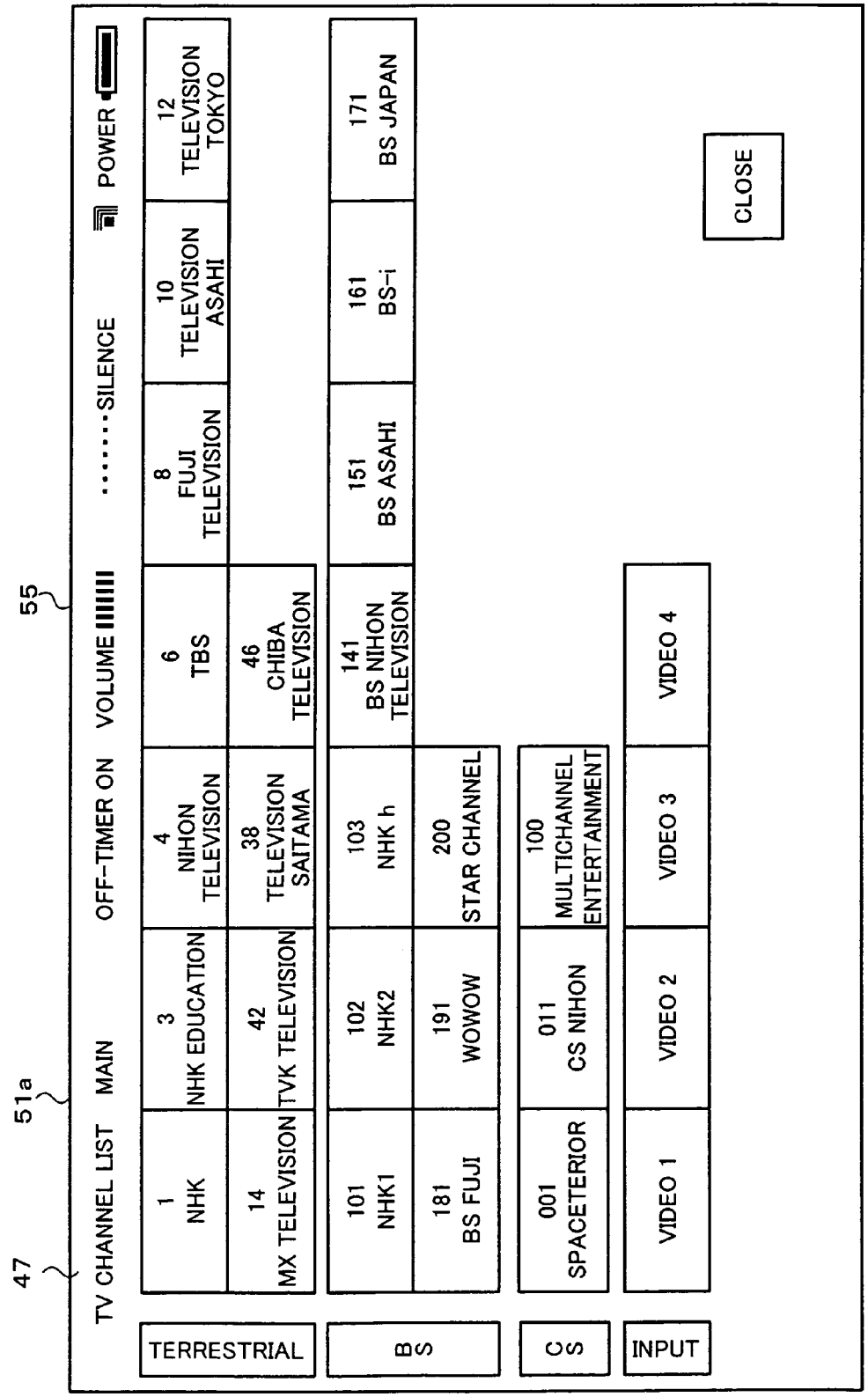

Fig. 5

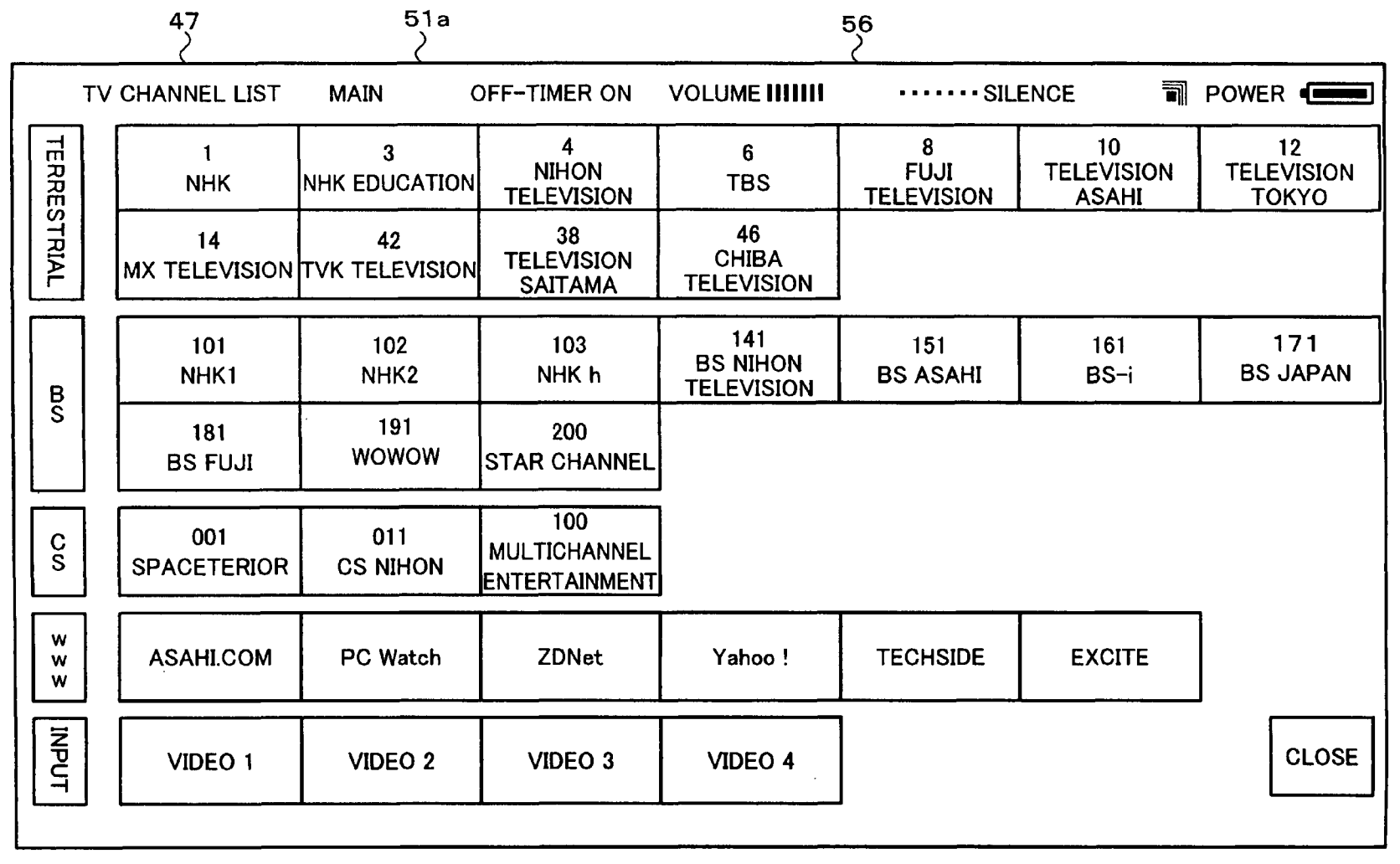

| TV CHANNEL LIST | MAIN | OFF-TIMER ON | VOLUME ▐▐▐▐▐ | ·······SILENCE | | 🏠 POWER ▐ |
|---|---|---|---|---|---|---|
| 1 NHK | 3 NHK EDUCATION | 4 NIHON TELEVISION | 6 TBS | 8 FUJI TELEVISION | 10 TELEVISION ASAHI | 12 TELEVISION TOKYO |
| 14 MX TELEVISION | 42 TVK TELEVISION | 38 TELEVISION SAITAMA | 46 CHIBA TELEVISION | | | |
| 101 NHK1 | 102 NHK2 | 103 NHK h | 141 BS NIHON TELEVISION | 151 BS ASAHI | 161 BS-i | 171 BS JAPAN |
| 181 BS FUJI | 191 WOWOW | 200 STAR CHANNEL | | | | |
| 001 SPACETERIOR | 011 CS NIHON | 100 MULTICHANNEL ENTERTAINMENT | | | | |
| ASAHI.COM | PC Watch | ZDNet | Yahoo! | TECHSIDE | EXCITE | |
| VIDEO 1 | VIDEO 2 | VIDEO 3 | VIDEO 4 | | | CLOSE |
| TERRESTRIAL | BS | CS | WWW | INPUT | | |

RECEIVING APPARATUS, RECEIVING METHOD, AND TRANSMITTING/RECEIVING APPARATUS

BACKGROUND OF THE INVENTION

The invention relates to a receiving apparatus, a receiving method, and a transmitting/receiving apparatus for monitoring a television broadcast program and contents which was received through the Internet.

In recent years, the use of broadband as network means for accessing the Internet at a high speed has rapidly become widespread. As specific examples of broadband, cable Internet using CATV (cable television), ADSL (Asymmetric Digital Subscriber Line), FTTH (Fiber To The Home), and the like can be given. As encoding systems of a streaming video, MPEG4 (Moving Picture Experts Group Phase 4), Windows (registered trademark) Media Player, RealVideo, and the like have been proposed and their development is progressing. Thus, it is demanded that a receiving apparatus in the home can also monitor streaming contents which is provided through broadband besides programs which are provided through a broadcast radio wave.

Heretofore, although an article in which a television broadcast and an Internet terminal are combined existed, it does not cope with the broadband and cannot monitor the streaming contents. In the case of enabling both the television broadcast program and streaming contents to be monitored, in the invention, a secondary display is used in addition to a primary display in order to improve the operability for monitoring.

Heretofore, as a digital broadcast receiver, a construction in which an auxiliary input/output apparatus having a small display is provided separately from a display main body having a large screen, the display main body and the auxiliary input/output apparatus being connected in a wireless manner, has been disclosed in JP-A-2001-203908. According to the apparatus disclosed in JP-A-2001-203908, the auxiliary input/output apparatus has a construction in which a touch panel is attached onto the screen, an electronic program table separated from the received television broadcast is displayed on the auxiliary input/output apparatus, and the operation to select a desired program or reserve the recording of the desired program is executed through the touch panel of the auxiliary input/output apparatus.

Problems to be solved are based on that in the receiving apparatus having the secondary display, contents which are monitored by the primary display and contents which are monitored by the secondary display can be freely switched and the switching operability is improved. In the case of transmitting the contents to the secondary display from the primary side, it is necessary to enable the contents to be certainly protected. Further, the function of the secondary display is expanded to the function of a selecting apparatus of the contents or a remote commander.

It is, therefore, an object of the invention to provide a receiving apparatus, a receiving method, and a transmitting/receiving apparatus in a system having two displays, in which the operation for switching the two displays, switching contents which are displayed on the displays, and the like can be preferably executed.

SUMMARY OF THE INVENTION

To solve the foregoing problems, according to the invention, there is provided a receiving apparatus including a television receiving apparatus operable to receive and monitor both broadcast signals and streaming data distributed over an Internet, the television receiving apparatus having a primary display; and a secondary display apparatus operable to communicate with the television receiving apparatus, wherein, when the receiving apparatus receives an analog broadcast signal, a video portion of the analog broadcast signal is displayed on the primary display, and is digitally compression encoded and sent to the secondary display apparatus, when the receiving apparatus receives a digital broadcast signal, the digital broadcast signal is decoded and displayed on the primary display, and the decoded signal is encoded again and sent to the secondary display, and when the receiving apparatus receives streaming data from the Internet, the streaming data is sent to the secondary display apparatus without decoding in the television receiving apparatus.

According to the invention, there is provided a receiving method including receiving and monitoring both broadcast signals and streaming data distributed over an Internet; when an analog broadcast signal is received, displaying a video portion of the analog broadcast signal on a primary display, and digitally compression encoding and sending the video portion of the analog broadcast signal to a secondary display apparatus, when a digital broadcast signal is received, decoding and displaying the digital broadcast signal on the primary display, and again encoding and sending the decoded signal to the secondary display, and when streaming data from the Internet is received, sending the streaming data to the secondary display apparatus without decoding.

BRIEF DESCRIPTION OF THE DRAWINGS

FIG. 3 is a schematic diagram for use in explanation of a display example of a display screen of the embodiment of the invention.

FIG. 4 is a schematic diagram showing a display example corresponding to a menu selected by a menu display.

FIG. 5 is a schematic diagram showing a display example corresponding to a menu selected by the menu display.

DETAILED DESCRIPTION

An embodiment of the invention will be described hereinbelow with reference to the drawings.

Figure 1:
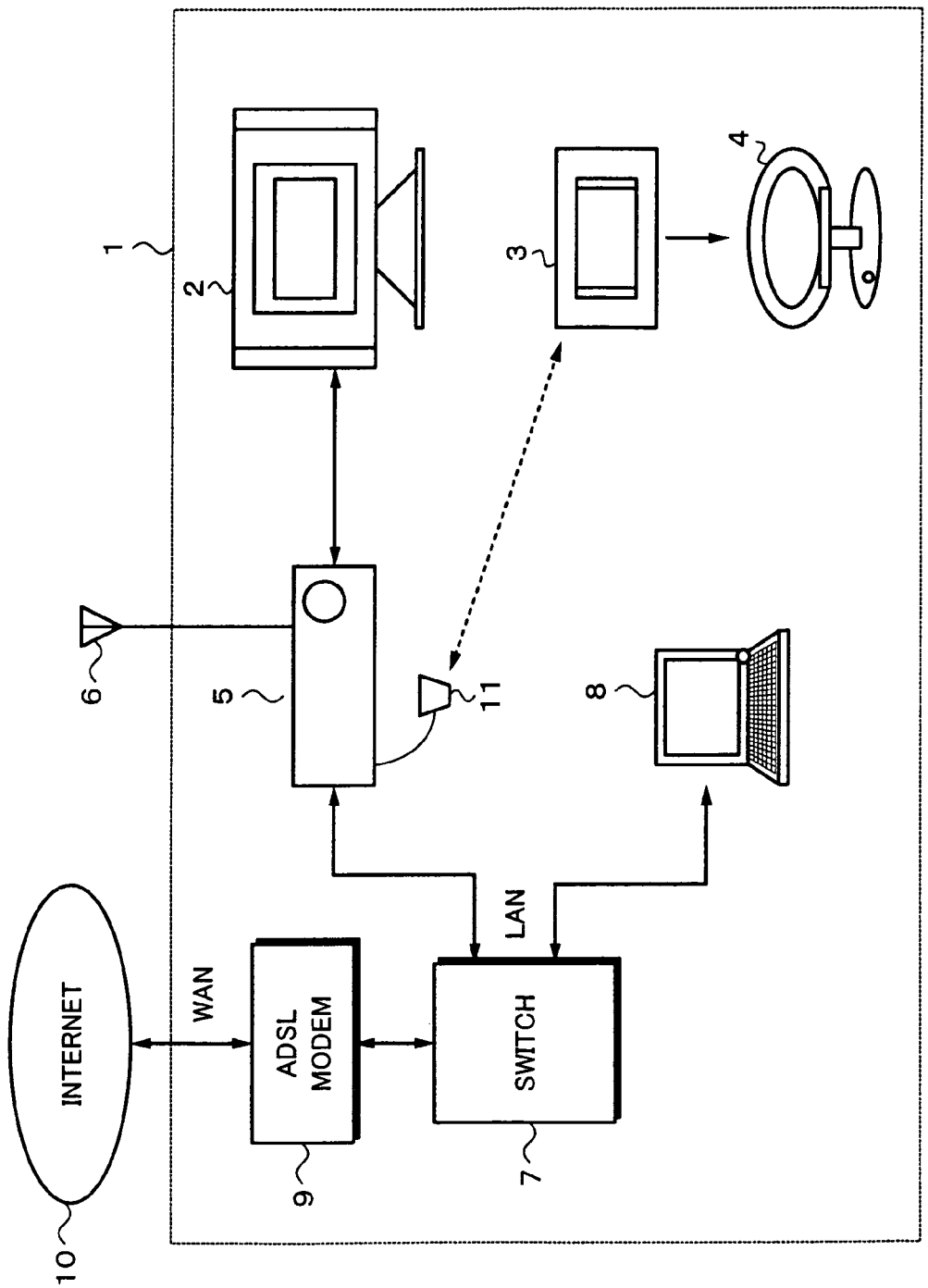
FIG. 1 is a block diagram showing a system construction of an embodiment of the invention.

In FIG. 1, reference numeral 1 denotes a whole display system to which the invention is applied; 2 indicates a first display unit (hereinafter, properly referred to as a primary display) having a large display panel such as a PDP (Plasma Display Panel), LCD (Liquid Crystal Display), or the like; and 3 is a small second display (hereinafter, properly referred to as a secondary display). The secondary display 3 has a construction in which a touch panel is laminated onto a small LCD of, for example, 7 inches, and in which the assembly is put on a pedestal 4 or can be carried by the user as necessary. In the following description, the secondary display 3 is used as a terminology including not only the LCD and the touch panel, but also a construction for communication with the primary display side, compressing/decompressing processes, system control, and the like.

A video signal to be displayed is supplied to the primary display 2 through a media receiver 5. The video signal is a broadcast signal or streaming data which is distributed through the Internet. The broadcast signal is received by an antenna 6 and the streaming data is branched by a switch 7 and supplied to the media receiver 5 through a LAN (Local Area Network). A personal computer 8 is connected to another branch of the switch 7.

The streaming data distributed through the Internet 10 is inputted to a WAN (Wide Area Network) side of a MODEM (modulator-demodulator) 9 of an ADSL (Asymmetric Digital Subscriber Line). The switch 7 is connected to the LAN side of the MODEM 9. The ADSL is an example of a broadband connection. As another method, video contents can be received through a broadband connection using CATV, FTTH, or the like. Further, the streaming data also can be obtained by using an IP (Internet Protocol) streaming broadcast. Ordinarily, the video contents are associated with audio data.

The media receiver 5 has two tuners for enabling different television broadcast programs to be supplied to the primary display 2 and the secondary display 3. The media receiver 5 transmits the video signal to the secondary display 3 through an access point 11 of a wireless LAN. Control data such as a remote control signal or the like can be transmitted to the access point 11 from the secondary display 3 and bidirectional communication can be made. For example, a wireless system of IEEE (Institute of Electrical and Electronics Engineers) 802.11 can be used and the standard of, for example, 802.11a in such a wireless system can be used. This standard uses a frequency of 5.2 GHz and can realize a transmission speed of maximum 54 Mbps.

Figure 2:
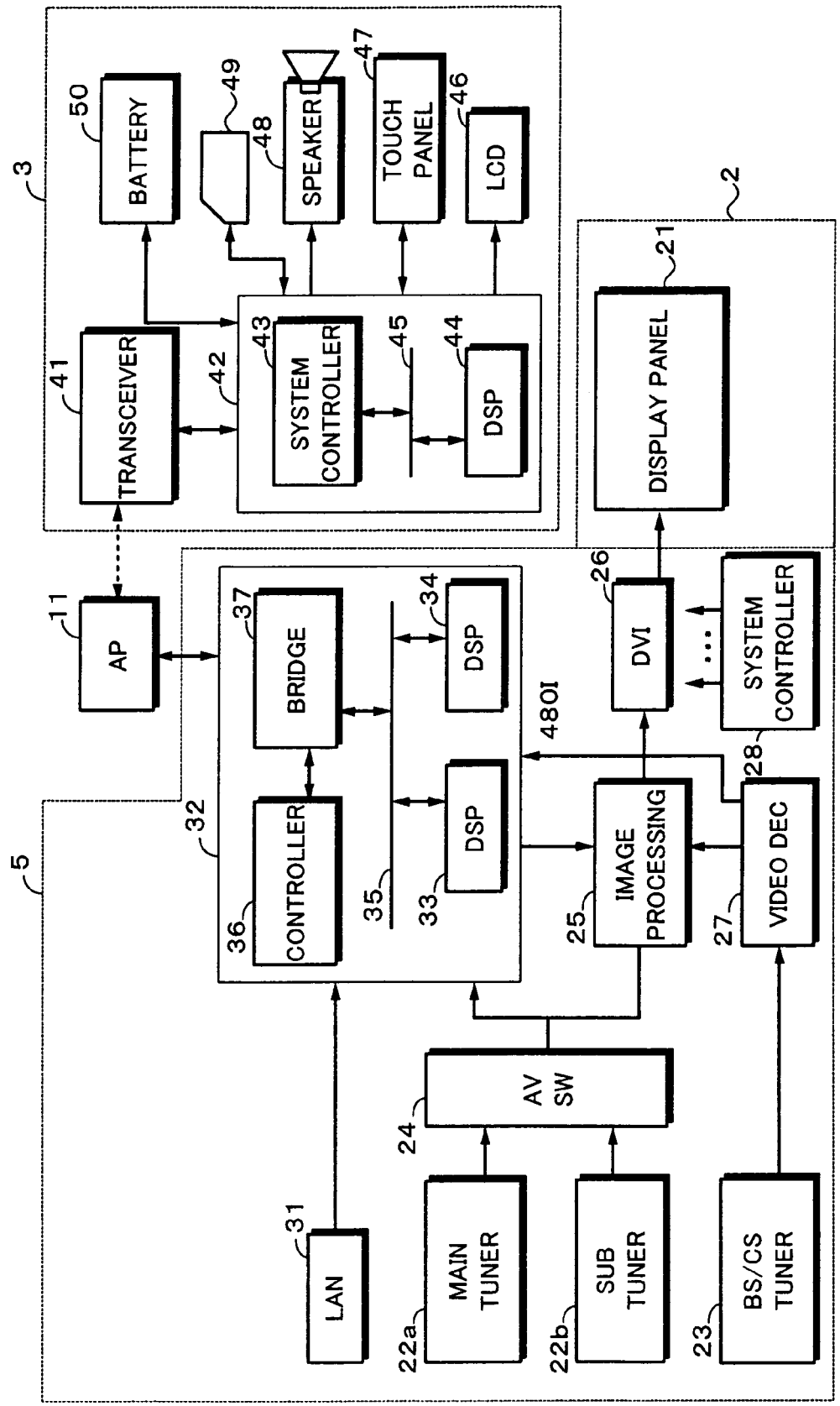
FIG. 2 is a block diagram showing a more detailed construction of the embodiment of the invention.

FIG. 2 shows, in more detail, the construction of an example of the display system comprising the primary display 2 and the secondary display 3. The primary display 2 has a relatively large display panel 21 of, for example, 30 inches or more and a driving unit (not shown).

A main tuner 22a and a subtuner 22b each for receiving a terrestrial wave are included in the media receiver 5. Reference numeral 23 denotes a digital tuner for receiving BS (Broadcasting Satellite) and 110° CS (Communication Satellite) signals. Although not shown, outputs of UHF/VHF antennas are supplied to the tuners 22a and 22b and an output of a parabolic antenna for receiving BS/110° CS signals is supplied to the digital tuner 23. In the embodiment, the main tuner 22a is used for the primary display 2 and the subtuner 22b is used for the secondary display 3.

The video signals of the main tuner 22a and the subtuner 22b are supplied to an AV switch 24. An output video signal of the AV switch 24 is inputted to an image processing unit 25 and a signal processing unit 32. The image processing unit 25 executes image processes for improving picture quality, such as a process to further raise resolution and the like.

An output signal of the image processing unit 25 is inputted to the display panel 21 of the primary display 2 through a DVI (Digital Visual Interface) 26 as a display interface. Although not shown, a picture quality adjusting circuit of the display panel 21 is provided at the front stage of the DVI 26. Further, in the case of supplying the digital video signal to the display panel 21, a copy prevention signal to prevent an illegal copy of the broadcast contents is also outputted. For example, HDCP (High band with Digital Content Protection) can be used to prevent the copy.

An output signal of the digital tuner 23 is inputted to a video decoder 27. For example, decoding by MPEG2 (Moving Picture Experts Group Phase 2) is executed by the video decoder 27. An HD (High Definition) video signal from the video decoder 27 is supplied to the image processing unit 25 and inputted to the display panel 21 through the DVI 26.

The video decoder 27 has a function for outputting an SD (Standard Definition) video signal, for example 480I (interlace signal in which the number of valid lines is equal to 480), to the signal processing unit 32. Reference numeral 28 denotes a system controller for controlling the operations of the primary display 2 and the media receiver 5, and the controller 28 is constructed by a CPU (Central Processing Unit). For example, the system controller 28 controls station selecting states of both of the main tuner 22a and the subtuner 22b and has information of the present station selecting state of each tuner in order to control them.

The streaming data and the data of HTML (Hypertext Markup Language) contents such as Homepage or the like which were received through the Internet are supplied to the signal processing unit 32 through a LAN 31. In the signal processing unit 32, two DSPs (Digital Signal Processors) 33 and 34 are connected to a bus such as PCI (Peripheral Component Interconnect) 35 and a controller 36 comprising a CPU is connected to the PCI 35 through a bridge 37.

The signal processing unit 32 executes decoding (for example, decoding of the encoding of MPEG4, Windows (registered trademark) Media Player, RealVideo, or the like) of the inputted streaming data. The decoded video signal is supplied to the image processing unit 25 and displayed by the primary display 2. Therefore, on the primary display 2, the broadcast signal from each of the main tuner 22a and the digital tuner 23 can be displayed and the HTML contents and the streaming contents which were received through the broadband can also be displayed.

The signal processing unit 32 encrypts the video signals from the subtuner 22b and the digital tuner 23, converts the encrypted video signals into a format in which they can be transmitted in a wireless manner, and sends the converted signals to the secondary display 3 through the access point 11. When the streaming contents received through the broadband is displayed on the secondary display 3, it is not decoded in the signal processing unit 32 but is sent to the secondary display 3 through the access point 11 while keeping the state where it has been compressed in the streaming compression format, that is, in a through state. On the other hand, the signal processing unit 32 processes control signals, such as a remote control signal or the like from the secondary display 3 which was received by the access point 11, and sends them to the system controller 28 on the primary display side. In this case, the decoding process of the streaming contents is executed in the secondary display 3.

The secondary display 3 has a transceiver 41 for making wireless communication with the access point 11. A signal processing unit 42 is connected to the transceiver 41. In the signal processing unit 42, a system controller 43 to control the operation of the secondary display 3 and a DSP 44 are connected through PCI 45.

A display panel, for example, an LCD 46, a transparent touch panel 47 laminated on the display screen of the LCD 46, a speaker 48, and a memory card 49 are connected to the signal processing unit 42. Further, a battery 50 as a power source is provided. The battery 50 can be charged by a power source from a power supplying circuit enclosed in, for example, the pedestal (refer to FIG. 1). The signal processing unit 42 decodes the encrypted video signal received from the access point 11, decodes the data received through the Internet, and displays the decoded signal on the LCD 46. Further, the signal processing unit 42 transmits a remote control signal, a command, or the like generated by the operation of the touch panel 47 to the primary display 2 side. Moreover, the signal processing unit 42 has a function for decoding still image data stored in the memory card 49 and displaying it onto the LCD 46.

The operation of the foregoing display system according to the embodiment of the invention will be described hereinbelow. The analog video signal of a base band demodulated in the main tuner 22a is converted into a digital signal, subjected to a picture quality improving process and an interlace/progressive converting process by the image processing unit 25, and thereafter, outputted to the display panel 21 through the DVI 26.

A base band analog signal demodulated by the subtuner 22b is supplied to the signal processing unit 32, converted into a digital signal, and thereafter, compressed in a digital compression format such as MPEG2, MPEG4, or the like. The compressed video signal is subjected to an encrypting process and, thereafter, is transmitted to the secondary display 3 through the access point 11 by the wireless LAN. The signal is subjected to a process for decrypting the encryption and a decompressing process by the signal processing unit 42 of the secondary display 3 and displayed by the LCD 46.

In the case where the input source is a digital broadcast signal, the digital broadcast signal is inputted to the digital tuner 23 and demodulated by a digital front-end block of the digital tuner 23. After that, the digital video signal is decoded by the video decoder 27. The digital video signal is displayed on the display panel 21 through the image processing unit 25 and the DVI 26.

The SD signal, for example, the video signal of 480I which is outputted from the video decoder 27, is sent to the signal processing unit 32, compressed in a digital compression format and encrypted by the signal processing unit 32. The resultant signal is transmitted to the secondary display 3 from the access point 11 of the wireless LAN. In the case where the input source is an HD signal, it is down-converted into an SD signal, for example, the video signal of 480I and, thereafter, sent to the signal processing unit 32. The down-conversion is a process for protection of a copyright of the digital broadcast contents.

In the case where the input source is streaming contents from the Internet, the signal inputted from the LAN 31 is subjected to a streaming decoding process in the signal processing unit 32 in accordance with the streaming compression format (MPEG4, Windows (registered trademark) Media Player, RealVideo, or the like) and sent to the display panel 21 through the image processing unit 25 and the DVI 26.

In the case of displaying the streaming contents on the secondary display 3, it is not subjected to the decoding process in the signal processing unit 32, but is transmitted to the secondary display 3 by the wireless LAN while keeping the state where it has been compressed by the streaming compression format. The decoding process of the streaming compression is executed by the signal processing unit 42 of the secondary display 3, the decoded video image is displayed by the LCD 46, and the decoded audio sound is reproduced by the speaker 48. By the above process, deterioration in the contents due to the decoding and re-encoding processes of the streaming contents can be prevented.

In the receiving system according to the embodiment of the invention, copyright protection is made as will be explained hereinbelow. First, with respect to the contents of the analog broadcast signal, if the analog copy of the contents is restricted, before it is sent to the secondary display 3, it is digitally compressed in the signal processing unit 32, and encrypted by an encrypting method such as 3DES (Data Encryption Standard), AES (Advanced Encryption Standard), or the like as measures to protect the contents. For example, in the case where a copy restriction signal of a macrovision system has been added to the analog video signal, the analog copy is restricted.

Further, as measures to protect the transmitting system, encryption on a transmission path is performed by the encrypting method used in the transmission of the wireless LAN. For example, RC4 ((Rivest Cipher) 4 Stream Cipher) is used in the wireless LAN (IEEE 802.11) and a WEP (Wired Equivalent Privacy protocol) is used as a forming algorithm of an encryption key. In the WEP, the encryption key is formed from an IV (Initial Vector) and a common key and a packet of the network is encrypted. As mentioned above, the first encryption as a measure for protection of the contents and the second encryption as a measure for protection of the transmitting system are performed to the contents of the analog broadcast signal.

On the secondary display 3 side, it communicates with the primary side and authentication is made. The encryption on the transmission path is decrypted in the transceiver 41 of the wireless LAN. Further, in the signal processing unit 42, the encryption for protection of the contents is decrypted. In the case where the secondary display 3 has an analog recording function, by detecting the macrovision signal, the recording can be restricted prior to recording. In the case where the secondary display 3 has an external output interface, by outputting the analog video signal while keeping the state where the macrovision signal has been added, the copy restriction can be similarly made to an external recording apparatus.

The copyright protection regarding the contents of the digital broadcast signal will now be described. The embodiment relates to an example in which one digital tuner 23 is provided. In this example, there is one mechanism of a conditional access having a function for protection of the copyright (specifically speaking, there is one IC card) and the data whose encryption has been decrypted in the digital tuner 23 is outputted to the primary display 2 through the video decoder 27. The mechanism for the conditional access depends on the number of digital tuners. To simultaneously monitor different digital broadcast contents by the primary display 2 and the secondary display 3, two digital tuners each having the mechanism of the conditional access also can be provided.

Further, in the case where the contents of the digital broadcast signal are monitored by the secondary display 3 as mentioned above, the digitally compressed signal is not sent as it is to the secondary display 3, but the analog signal decoded by the video decoder 27 is supplied to the signal processing unit 32 once, it is encoded again by a compression system suitable for transmission in the home in the signal processing unit 32, the double encryptions, that is, the encryption for protection of the contents and the encryption for protection of the transmission, are executed in a manner similar to the case of the copyright protection of the analog broadcast signal, and the encrypted signal is sent to the secondary display 3. In the case of the HD contents of the digital broadcast, it is down-converted into the SD contents of 480I and sent to the secondary display 3. Therefore, even if the encryption is decrypted, the copyright of the HD contents can be substantially protected. As mentioned above, the copyright protection of the contents which are transmitted between the media receiver 5 (primary display 2) and the secondary display 3 can be made at a high degree of safety.

Information associated with the television broadcast program, for example, an outline, casts, and the like regarding a drama, can be browsed in a site of a predetermined URL (Uniform Resource Locator) on the Internet. To control the main tuner 22a, the system controller 28 of the media receiver 5 of the primary display side has station selection information regarding the present station selecting state of the main tuner 22a. This station selection information is sent to the system controller 43 of the signal processing unit 42 of the secondary display 3.

A browser to browse and display Internet information and a database showing a corresponding relationship between the program and the URL have been installed in the secondary display 3. The program which is being monitored can be known from the station selection information received from the primary display 5, for example, information of the station selection channel and the present time. A URL of an associated site of such a program can be known from the database. The site is accessed through the Internet 10 and the associated information of the program which is being monitored is obtained and displayed on the secondary display 3. That is, while the broadcast program is displayed on the large display panel 21 of the primary display, the associated information of the broadcast program which is being monitored can be displayed on the LCD 46 of the secondary display 3. Since the associated information is not displayed on the display screen of the display panel 21, there is no fear that the monitoring of the program is obstructed by the associated information. Since the user watches the associated information by the LCD 46 at hand, he can easily see small characters.

It is also possible to detect a signal necessary to access the associated information included in the broadcast signal and access the site of the associated information on the basis of the detected signal. For example, it is also possible to construct the system in such a manner that a data signal serving as a trigger is transmitted from a broadcasting station when the program is transmitted and the data signal is detected, thereby automatically detecting the URL of the associated site.

In the foregoing display system, the selection of the broadcast program to be monitored and the selection of the contents of the Internet are performed by a GUI (Graphical User Interface) using the touch panel 47. On the touch panel 47, desired contents can be selected by the touching and releasing operation, that is, one operation.

FIG. 3 shows a selection display, for example, a menu display 54 which is displayed when a finger 52 (or a touch pen) is touched onto a sensor unit 51b on the right side of the touch panel 47. When the finger 52 is vertically moved in the state where it is touched onto the sensor unit 51b, only a menu item of almost the same height as that of the finger 52 is highlighted. FIG. 3 shows the state where a channel list of the menu items is highlighted.

When the finger 52 is released at the position of the highlighted menu item, this menu item is selected. A display screen of a lower layer corresponding to the selected menu item is displayed. Although not shown in FIG. 3, when the menu display 54 is displayed, an image of the LCD 46 of the secondary display 3 is displayed in a display/sensor unit 51a of the touch panel 47.

Although the position of the finger 52 is located on the sensor unit 51b, in the case of the position where the menu item does not exist in the lateral direction, the menu item is not highlighted. That is, when the finger is touched to the upper or lower area out of a range where six menu items are arranged, since there are no adjacent buttons, no button is highlighted. When the finger is released from the sensor unit 51b in this state, it is determined that the selecting action has been cancelled, the processing routine is finished, the state does not change, and the display of the menu display 54 is continued.

In the case where the finger 52 is further moved to the display/sensor unit 51a of almost the same size as that of the display screen of the LCD 46, it is determined that the selecting action has been cancelled, the processing routine is finished, and the display of the menu display 54 disappears. In this case, even if the finger 52 is released from the touch panel 47 after that, the state does not change.

FIG. 4 shows an example of a display 55 in the case where a menu item of "television channel list" is selected. Channels of the terrestrial wave, BS, CS, and inputs (Video 1 to Video 4) are displayed on the LCD 46. A desired channel can be selected by the display/sensor unit 51a of the touch panel 47. The channel list of FIG. 4 is a display of the list showing, for example, the items which are displayed on the primary display 2.

FIG. 5 shows an example of a display 56 in the case where a menu item of "channel list" is selected. It shows a list of all contents which can be monitored by the secondary display 3. In addition to the channels of the television for monitoring the contents of the television broadcasts and the video inputs shown in FIG. 4, channels of news which are received through the Internet, streaming contents which are received through the broadband, and the like are displayed on the LCD 46. A desired channel can be selected by the display/sensor unit 51a of the touch panel 47.

As shown in the example of the display 56 of FIG. 5, by unitarily displaying a list of all sources which can be received on the LCD 46 of the secondary display 3, a desired contents can be selected by one selecting operation without distinguishing the television broadcast from the Internet. In other words, the broadcast contents and network distribution contents including images such as motion images, still images, or the like and an audio sound can be seamlessly selected.

Figure 6:
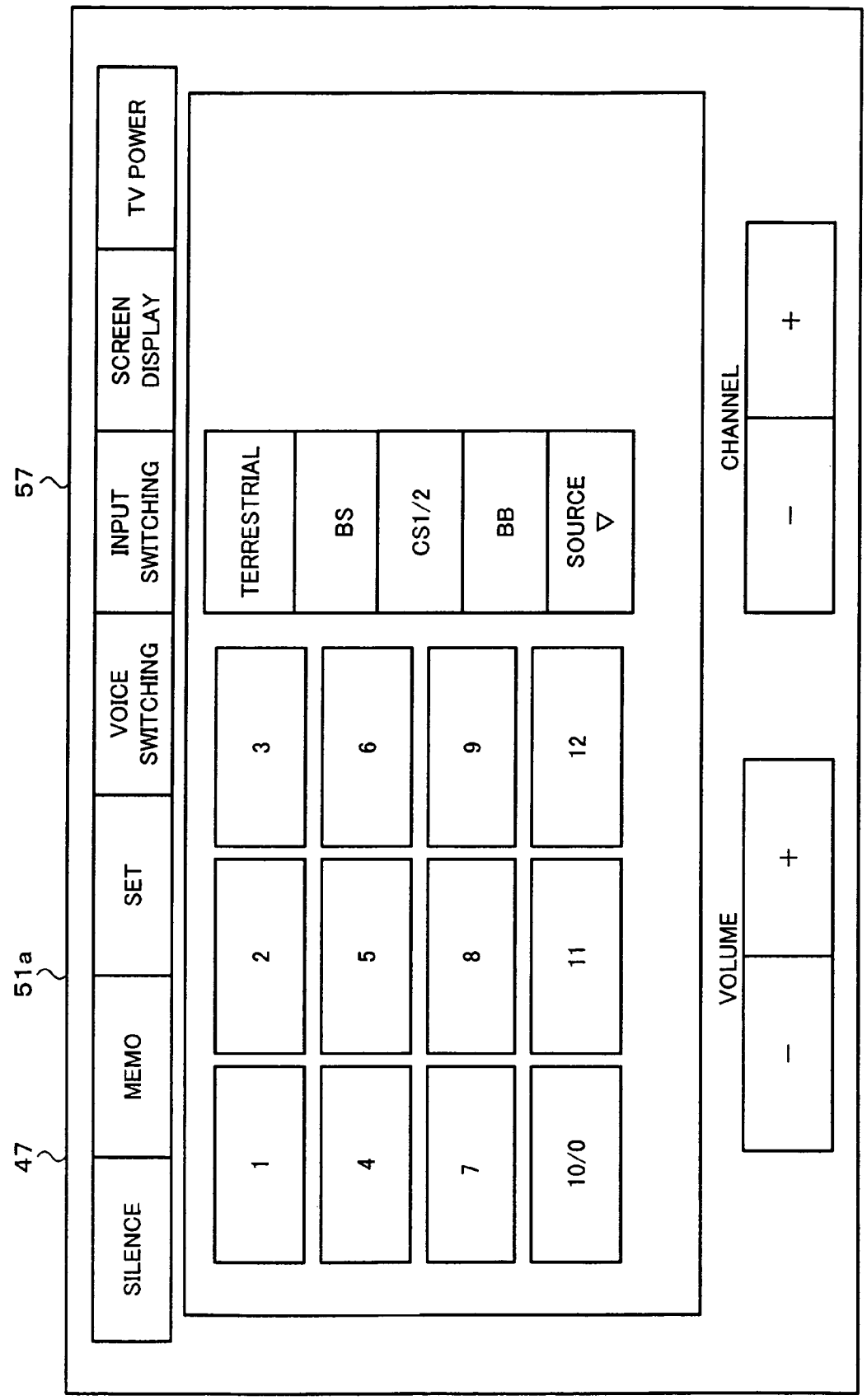
FIG. 6 is a schematic diagram showing a display example corresponding to a menu selected by the menu display.

FIG. 6 shows an example of a display 57 in the case where a menu item of "TV remote controller" is selected. Buttons for a remote controller are displayed on the display screen of the LCD 46. By pressing a desired button in the display/sensor unit 51a of the touch panel 47, the primary display 2 and the media receiver 5 can be controlled. The buttons for the remote controller are buttons for ten-key, increase/decrease in sound volume, channel switching, and the like. Since the secondary display 3 has a function as a remote control commander as mentioned above, there is no need to separately prepare a commander and it is possible to prevent the number of commanders from excessively increasing in the home. Besides the remote control of the primary display 2, a mode of remote control of AV equipment such as a recorder or the like also can be prepared.

Although not shown, a display according to the case where a menu item of "memory stick (registered trade name)" is selected, a display according to the case where a menu item of "Internet" is selected, and a display according to the case where a menu item of "setup" is selected may be displayed on the LCD 46.

The menu display screen, the display screen of the channel list, and the operation display screen for a GUI such as a remote control commander or the like which are displayed on the secondary display 3 mentioned above are shown as examples, and other constructions are possible. Since the embodiment relates to a system which can be connected to the Internet, a desired operation display screen for the GUI according to the preferences of the user can be downloaded from a site for services only for use in the system. Besides the network, a desired operation display screen for the GUI can be also installed into the controller for controlling the secondary display 3 from a recording medium such as CD-ROM, DVD, memory card, or the like. Further, it is possible to cope with version-up of the operation display screen for the GUI. By changing the operation display screen for the GUI in accordance with the preferences of the user, the GUI which can be most easily used by the user is provided without buying a new apparatus in place of the old one and the operability can be improved.

The operation of selecting the contents to be monitored by the primary display 2 will now be described. In the embodiment, one of the station selecting operations is the operation to instruct the contents to be monitored by displaying the channel list by the secondary display 3 as mentioned above and the other operation is the operation to operate the remote control display screen displayed on the secondary display 3. Further, the station selecting operation also can be executed by the operation of another commander as necessary.

Generally, in order to search for the contents to be monitored, if the large primary display 2 is controlled by the remote control commander and the switching of channels is frequently executed, the video images and the audio sounds are complicatedly switched and the user himself and other viewers often feel uncomfortable. To solve such a problem, in the embodiment, besides the foregoing station selecting operation, the station selecting operation using a program index can be executed. In the station selecting operation using the program index, the system is instructed in such a manner that a list of the contents of the channels which can be monitored by the secondary display 3 is displayed, the channel to be monitored is determined by the list display, and after that, the decided channel is displayed on the primary display 2.

Figure 7:
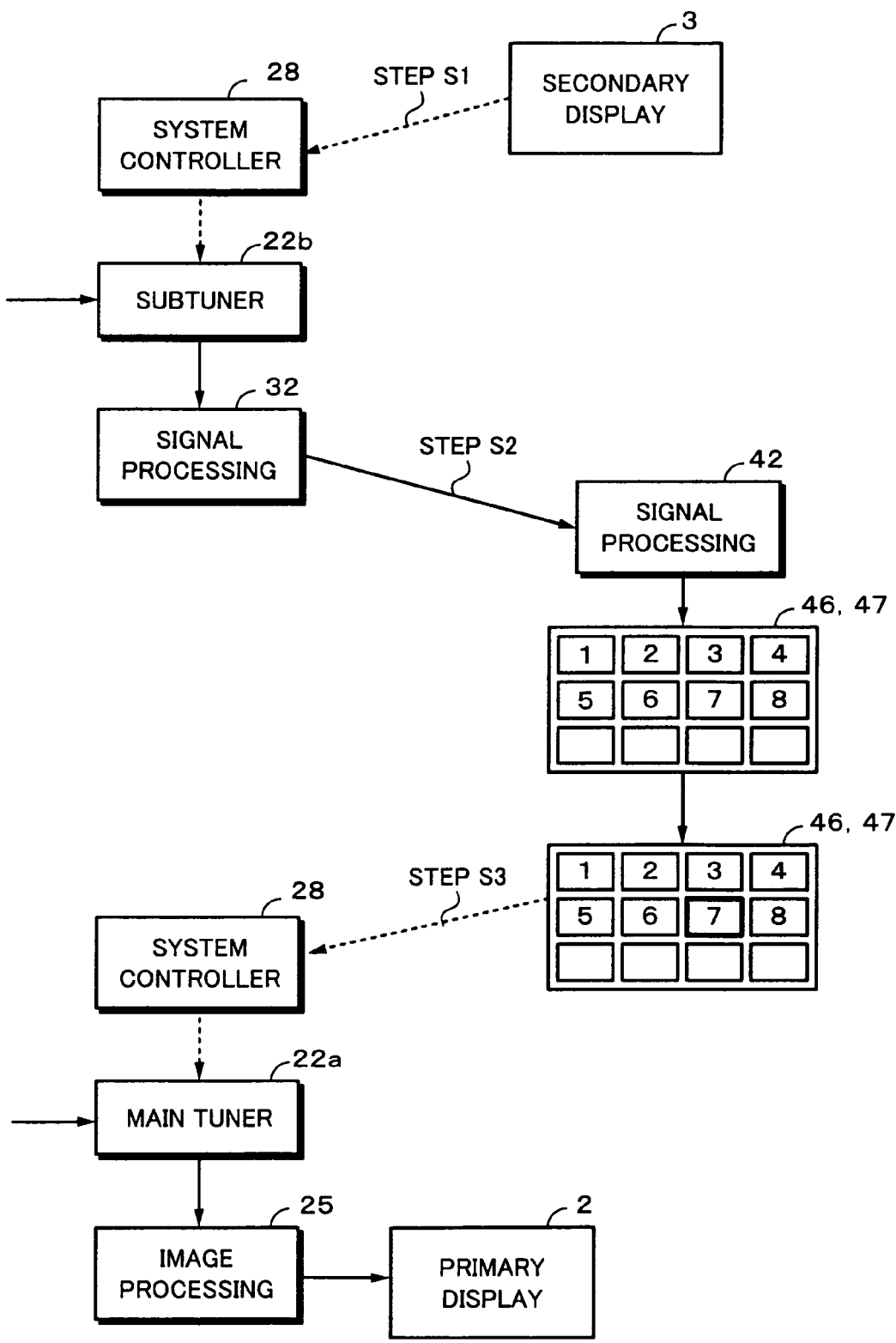
FIG. 7 is a schematic diagram for explaining an index display.

FIG. 7 is a schematic diagram for explaining the station selecting operation using the program index in accordance with a time-sequential flow. First, a command to create the program index is generated by the operation of the user in the secondary display 3 and transmitted to the system controller 28 of the primary tuner 2 through the wireless LAN (step S1).

The system controller 28 controls the subtuner 22b so as to sequentially execute the station selecting operation. The signal received by the subtuner 22b is supplied to the signal processing unit 32. The signal processing unit 32 captures one still image from the program of each of the channels selected by the subtuner 22b. The captured still image (referred to as an index image) is reduced by compression such as decimation and compressed by JPEG (Joint Photographic Experts Group) encoding in the signal processing unit 32. One index image is captured from each channel by one sequential station selection. The corrected index image is held until a new index image is captured by the second sequential station selecting operation.

The compressed index image is transmitted to the secondary display side through the access point 11 of the primary display side in a wireless manner (step S2). In the secondary display 3, the compressed index image received by the transceiver 41 is decompressed by the signal processing unit 42. The decompressed index image is displayed on the LCD 46. For example, a maximum of 12 (that is, 12 channels) index images are displayed as 12 split display screens of 3×4. In the example of FIG. 7, the index images of the first to eighth channels are displayed on the LCD 46.

The user determines the program to be monitored while seeing the index display. For example, he determines the program to be monitored by touching the position on the touch panel 47 where the index image of the desired program is displayed. FIG. 7 shows the state where the seventh channel has been selected. This selecting instruction is transmitted to the primary display side through the transceiver 41 and the access point 11 in a wireless manner (step S3).

The system controller 28 of the primary display side receives the selection instruction signal from the secondary display 3 and controls the main tuner 22a so as to receive the instructed channel. In the above example, since the 7th channel has been selected, the main tuner 22a receives the 7th channel. The reception signal of the main tuner 22a is processed by the image processing unit 25 or the like and the program of the 7th channel is displayed on the primary display 2.

When the output of the digital tuner 23 is not displayed on the primary side, it is also possible to construct the system in such a manner that the digital tuner 23 is made to execute the sequential station selecting operation and an index image showing the contents of the programs of the channels is formed. Further, an index image formed from the streaming contents received through the broadband can be also displayed by the secondary display 3. Moreover, the index image is not limited to the still image but also can be a moving image of a short time. In this case, the compression is performed by a code for moving images such as MPEG4 or the like.

By the foregoing index display, the contents of all programs which can be monitored can be unitarily grasped by the primary display and the desired program among them can be determined. Therefore, it is unnecessary to sequentially switch the channels and examine the contents of the program which is being broadcasted on the primary display side having the large display. The occurrence of the uncomfortable feeling due to the frequent switching of the channels is eliminated and the operability upon station selection of the user can be improved. Such an advantage is large, particularly in the case where the number of broadcast channels which can be received is large or the case where streaming contents can be monitored through the broadband.

Further, in the embodiment of the invention, the switching process of the desired display image is instructed by the movement of the finger 52 from the bottom to the top on the touch panel 47 (in the case of "throw"), the movement of the finger 52 from the top to the bottom (in the case of "catch"), and the movement of the finger 52 from the top to the bottom and, subsequently, from the bottom to the top (in the case of "swap"). The operation to switch those display images also can be instructed by operating buttons displayed on a remote controller display screen or the like.

"Throw" is a process for displaying the same image as that displayed on the secondary display 3 on the primary display 2. "Catch" is a process for displaying the same image as that displayed on the primary display 2 on the secondary display 3. "Swap" is a process for exchanging the display of the primary display 2 for the display of the secondary display 3. Such a process for changing the display image as mentioned above can be realized by transmitting the command from the secondary display 3 to the primary display 2 side and controlling the main tuner 22a and the subtuner 22b by the system controller 28. By the control of the tuners, it is possible to execute the operation which gives an impression as if the contents were bidirectionally transmitted and received between the display panel 21 of the primary display 2 and the LCD 46 of the secondary display 3.

Figure 8:
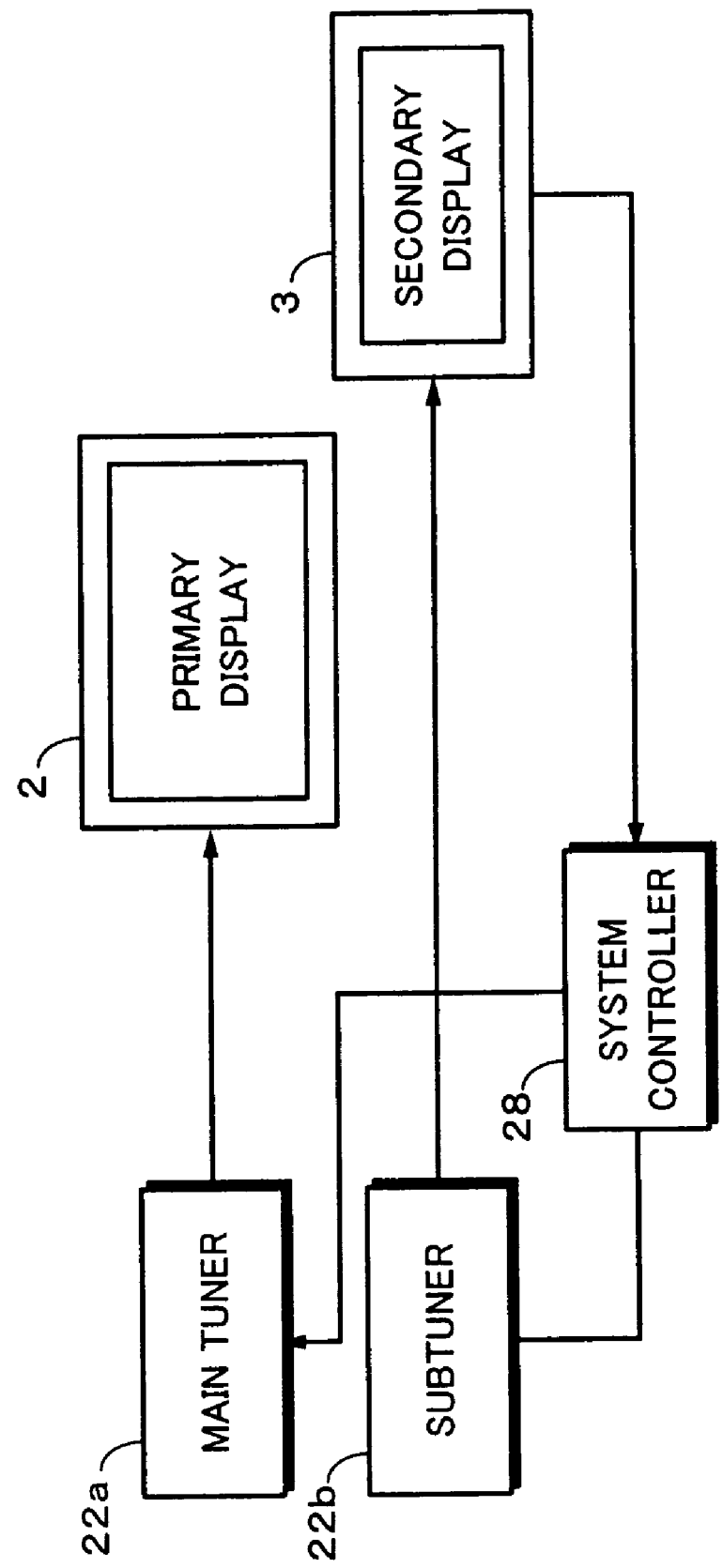
FIG. 8 is a schematic diagram for use in explaining a process to exchange a display of a primary display for a display of a secondary display by controlling two tuners when broadcast contents are monitored.

FIG. 8 schematically shows a construction to realize the process to exchange the image display. The system controller 28 of the primary display 2 side controls the station selecting states of the main tuner 22a and the subtuner 22b. The reception signal of the main tuner 22a is displayed by the primary display 2 and the reception signal of the subtuner 22b is displayed by the secondary display 3.

In the secondary display 3, when the "throw" command generated by the operation on the touch panel 47 is sent to the system controller 28 through the wireless communication, the system controller 28 makes the station selection information of the main tuner 22a coincide with that of the subtuner 22b. Thus, the same image as that displayed on the secondary display 3 is displayed on the primary display 2.

When the "catch" command is generated in the secondary display 3, the system controller 28 makes the station selection information of the subtuner 22b coincide with that of the main tuner 22a. Thus, the same image as that displayed on the primary display 2 is displayed on the secondary display 3.

Further, when the "swap" command is generated in the secondary display 3, the system controller 28 exchanges the station selection information of the main tuner 22a for that of the subtuner 22b. Thus, the image displayed on the primary display 2 is exchanged for the image displayed on the secondary display 3.

Figure 9:
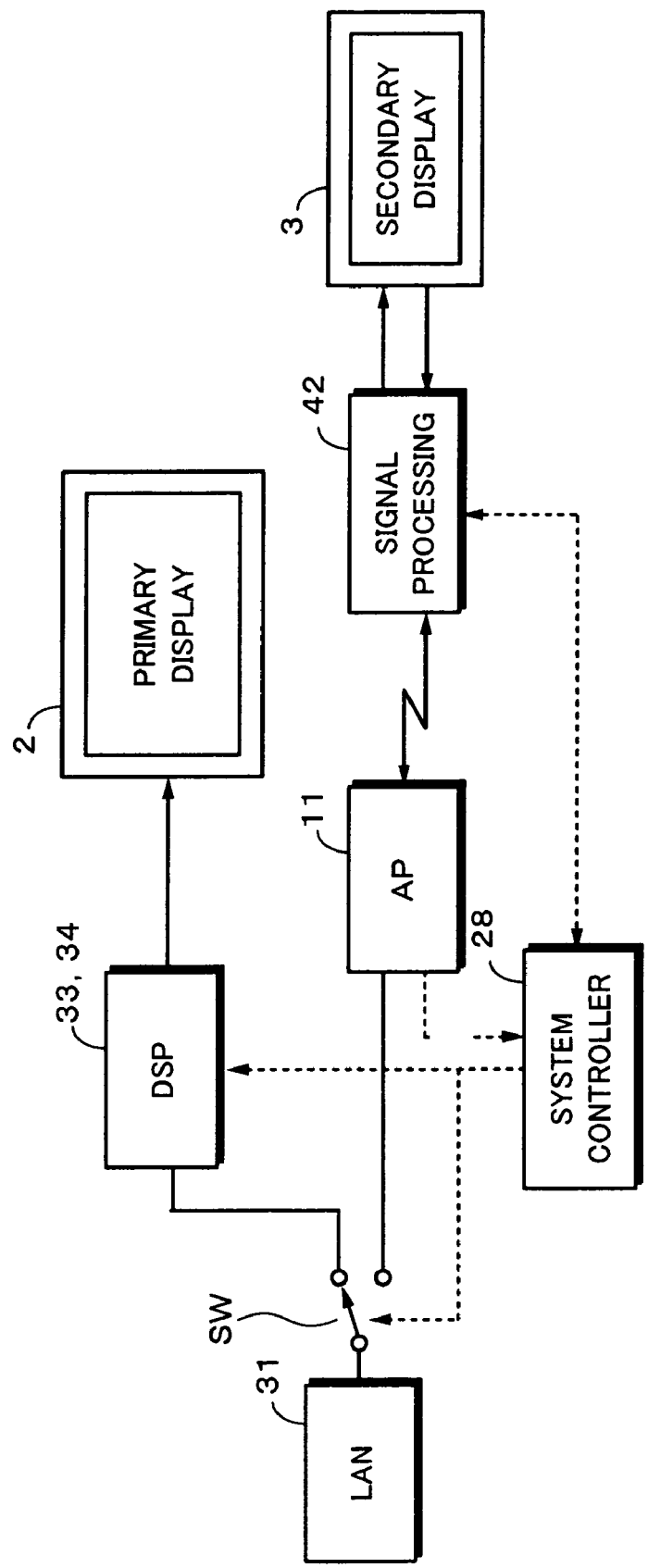
FIG. 9 is a schematic diagram for use in explaining a process to exchange the display of the primary display for the display of the secondary display when streaming contents are monitored.

In FIG. 9, an operation similar to that mentioned above is executed with respect to the streaming contents received through the broadband instead of the broadcast contents. The streaming contents received through the broadband connection and the LAN 31 is inputted to a switch SW. When the input is switched to the Internet and the streaming contents is selected, first, the streaming signal from the Internet is transmitted to the secondary display in a wireless manner through the switch SW and the access point 11 without being decoded. The streaming compression is decoded in the signal processing unit 42 of the secondary display 3. The video image and the audio sound can be monitored by the secondary display 3.

The process for "throw" can be executed while the user is monitoring the streaming contents by the secondary display 3. In the secondary display 3, when the "throw" command is sent to the system controller 28 of the primary display side by the operation on the touch panel 47 or the like, the system controller 28 controls the switch SW so as to switch to the primary side and sends control signals to the DSPs 33 and 34 of the signal processing unit 32, so that the decoding process of the received streaming signal is started. The decoded streaming contents can be monitored by the primary display 2.

The process of "catch" can be executed while the user is monitoring the streaming contents by the primary display 2. In the secondary display 3, when the "catch" command is generated, the system controller 28 switches the switch SW to the secondary side and the streaming signal which is not decoded is sent to the secondary display 3 in a wireless manner. The streaming contents is decoded by the signal processing unit 42 of the secondary display 3 and the streaming contents can be monitored by the secondary display 3.

In the embodiment, since the system has an input of only one streaming contents, "swap" cannot be realized. However, by using a construction having inputs of two or more streaming contents, "swap" can be executed. As mentioned above, the user can enjoy the streaming contents received through the broadband by immediately exchanging it between the primary display and the secondary display.

The invention is not limited to the embodiment or the like of the invention mentioned above but various modifications and applications are possible within the scope without departing from the essence of the invention. For example, the primary display 2 and the secondary display 3 also can be connected in a wired manner instead of the wireless manner.

| DESCRIPTION OF REFERENCE NUMERALS | |
|---|---|
| 2 | PRIMARY DISPLAY |
| 3 | SECONDARY DISPLAY |
| 4 | PEDESTAL |
| 5 | MEDIA RECEIVER |
| 11 | ACCESS POINT |
| 22a | MAIN TUNER |
| 22b | SUBTUNER |
| 23 | DIGITAL TUNER |
| 28 | SYSTEM CONTROLLER |
| 43 | SYSTEM CONTROLLER |
| 46 | LCD |
| 47 | TOUCH PANEL |
| 51a | DISPLAY/SENSOR UNIT |
| 51b | SENSOR UNIT |
| 52 | FINGER |
| 53 | SELECTION DISPLAY |
| 54 | MENU DISPLAY |

The invention claimed is:

1. A receiving system, comprising:

a television receiving apparatus operable to receive and monitor both broadcast signals and streaming data distributed over an Internet, the television receiving apparatus having a primary display apparatus; and a secondary display apparatus operable to communicate with the television receiving apparatus, wherein when the receiving apparatus receives an analog broadcast signal, a video portion of the analog broadcast signal is displayed on the primary display, and is digitally compression encoded and sent to the secondary display apparatus, when the receiving apparatus receives a digital broadcast signal, the digital broadcast signal is decoded and displayed on the primary display, and the decoded signal is encoded again and sent to the secondary display, when the digital broadcast signal is a high definition (HD) digital broadcast signal, the HD digital broadcast signal is down-converted to a standard definition (SD) digital broadcast signal before being sent to the secondary display, and when the receiving apparatus receives streaming data from the Internet, the streaming data is sent to the secondary display apparatus without decoding in the television receiving apparatus, wherein the secondary display is operable to display on a single screen thereof a plurality of index images each representative of a captured image of a respective program so as to enable the index images of a plurality of different programs to be displayed on the single screen of the secondary display, and contents obtained from television broadcast and the Internet can be selected for display, wherein a data signal is received which is included in the broadcast signal and which serves as a trigger for automatically accessing information associated with the broadcast program from a web site, and while the primary display is displaying a broadcast program obtained from a broadcast signal, the secondary display is operable to concurrently display the information associated with the broadcast program, wherein the television receiving apparatus includes at least two tuners and a controller for controlling station selecting states of the tuners, and the station selecting states of the tuners are controlled in response to a command generated in the secondary display, and wherein images received from plural sources are concurrently displayed on the secondary display apparatus.

2. A receiving apparatus according to claim 1, wherein encryption for transmission and reception and encryption for contents protection are executed on a contents signal transmitted to the secondary display from the television receiving apparatus.

3. A receiving apparatus according to claim 1, wherein the television receiving apparatus is operable to obtain information associated with the received broadcast signals; the primary display is operable to display a broadcast program based on the received broadcast signals; the television receiving apparatus is further operable to send information associated with the broadcast program to the secondary display; and the secondary display is operable to display the information associated with the broadcast program.

4. A receiving apparatus according to claim 1, wherein the secondary display is operable to display television broadcast contents, contents obtained through the Internet and a display for a commander to remote-control the television receiving apparatus, and a remote control signal is generated based on the display for the commander.

5. A receiving apparatus according to claim 4, wherein the television receiving apparatus is operable to download through the Internet data for constructing the display for the commander.

6. A receiving apparatus according to claim 4, wherein the television receiving apparatus is operable to install through a recording medium data for constructing the display for the commander.

7. A receiving apparatus according to claim 1, wherein the secondary display is operable to display a display for a commander to remote-control the television receiving apparatus, and the television receiving apparatus as operable to download through the Internet data for constructing both the display for the commander and a display screen of the list of the contents which can be selected for display.

8. A receiving apparatus according to claim 1, wherein the secondary display is operable to display a display for a commander to remote-control the television receiving apparatus, and the television receiving apparatus is operable to install through a recording medium data for constructing both the display for the commander and a display screen of the list of the contents which can be selected for display.

9. A receiving apparatus according to claim 1, wherein the secondary display is operable to generate a command to transfer the streaming data from the Internet from one of the primary display or the secondary display to the other of the primary display or the secondary display.

10. A receiving method, comprising:
receiving and monitoring both broadcast signals and steaming data distributed over an Internet by use of a television receiving apparatus having a primary display;
when an analog broadcast signal is received, displaying a video portion of the analog broadcast signal on the primary display, and digitally compression encoding and sending the video portion of the analog broadcast signal to a secondary display,
when a digital broadcast signal is received, decoding and displaying the digital broadcast signal on the primary display, and again encoding and sending the decoded signal to the secondary display,
when the digital broadcast signal is a high definition (HD) digital broadcast signal, the HD digital broadcast signal is down-converted to a standard definition (SD) digital broadcast signal before being sent to the secondary display, and
when streaming data from the Internet is received, sending the streaming data to the secondary display without decoding,
the secondary display being operable to display on a single screen thereof a plurality of index images each representative of a captured image of a respective program so as to enable the index images of a plurality of different programs to be displayed on the single screen of the secondary display, in which contents obtained from television broadcast and the Internet can be selected for display,
wherein a data signal is received which is included in the broadcast signal and which serves as a trigger for automatically accessing information associated with the broadcast program from a web site, and while displaying a broadcast program obtained from a broadcast signal on the primary display, concurrently displaying the information associated with the broadcast program on the secondary display,
the television receiving apparatus includes at least two tuners and a controller for controlling station selecting states of the tuners, and the station selecting states of the tuners are controlled in response to a command generated in the secondary display, and
images received from plural sources are concurrently displayed on the secondary display.

11. The receiving apparatus according to claim 1, further comprising means for encrypting a contents signal by use of a first type of encryption process and means for performing an encrypting process on a transmission path by use of a second type of encryption process which is different from the first type of encryption process.

12. The receiving apparatus according to claim 1, wherein the SD digital broadcast signal is a 480I signal.

13. The receiving method according to claim 10, wherein the SD digital broadcast signal is a 480I signal.

14. A receiving system, comprising:
a television receiving apparatus operable to receive and monitor both broadcast signals and streaming data distributed over an Internet, the television receiving apparatus having a media receiver for receiving and transmitting to a primary display apparatus the broadcast signals and streaming data distributed over the Internet; and
a secondary display apparatus operable to communicate with the media receiver,
wherein a data signal is received which is included in the broadcast signal and which serves as a trigger for automatically accessing information associated with the broadcast program from a web site, and while the primary display is displaying a broadcast program obtained from a broadcast signal, the secondary display is operable to concurrently display the information associated with the broadcast program,
the secondary display is operable to display on a single screen thereof a plurality of index images each representative of a captured image of a respective program so as to enable the index images of a plurality of different programs to be displayed on the single screen of the secondary display, and contents obtained from television broadcast and the Internet can be selected for display,
when a user chooses an index image through the secondary display apparatus, an instruction signal of choosing is transmitted to said media receiver and when said instruction signal of choosing is transmitted from said media receiver to said primary display apparatus, said primary display apparatus monitors the content related to said index image according to the instruction signal of choosing transmitted by said media receiver, and images received from plural sources are concurrently displayed on the secondary display apparatus.

15. A receiving apparatus according to claim 1, wherein the secondary display apparatus includes a touch panel that is laminated onto a liquid crystal display (LCD).

16. A receiving apparatus according to claim 1, wherein two or more of images received from broadcast channels, images received over the Internet, and streaming content received via broadband are concurrently displayed on the secondary display apparatus.

17. A receiving method according to claim 10, wherein two or more of images received from broadcast channels, images received over the Internet, and streaming content received via broadband are concurrently displayed on the secondary display apparatus.

18. A receiving apparatus according to claim 14, wherein the secondary display apparatus includes a touch panel that is laminated onto a liquid crystal display (LCD).

19. A receiving apparatus according to claim 14, wherein two or more of images received from broadcast channels, images received over the Internet, and streaming content received via broadband are concurrently displayed on the secondary display apparatus.

* * * * *